(12) United States Patent
Lynch

(10) Patent No.: US 8,798,244 B2
(45) Date of Patent: *Aug. 5, 2014

(54) HANDHELD ELECTRONIC DEVICE HAVING SERVICE-SPECIFIC MESSAGE MANAGEMENT FEATURE SUPPORT AND ASSOCIATED METHOD

(75) Inventor: Daniel Gregory Lynch, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 112 days.

This patent is subject to a terminal disclaimer.

(21) Appl. No.: 13/481,156

(22) Filed: May 25, 2012

(65) Prior Publication Data

US 2012/0239765 A1 Sep. 20, 2012

Related U.S. Application Data

(63) Continuation of application No. 11/469,619, filed on Sep. 1, 2006, now Pat. No. 8,208,610.

(51) Int. Cl.
*H04M 11/00* (2006.01)

(52) U.S. Cl.
USPC ........................ 379/93.01; 709/206

(58) Field of Classification Search
USPC ................................. 709/223, 206
See application file for complete search history.

(56) References Cited

U.S. PATENT DOCUMENTS

| | | | |
|---|---|---|---|
| 6,275,831 B1 | 8/2001 | Bodnar et al. | |
| 6,377,978 B1 | 4/2002 | Nguyen | |
| 6,473,794 B1 | 10/2002 | Guheen et al. | |
| 6,519,571 B1 | 2/2003 | Guheen et al. | |
| 6,536,037 B1 | 3/2003 | Guheen et al. | |
| 6,606,649 B1 | 8/2003 | Schwitters et al. | |
| 6,615,166 B1 | 9/2003 | Guheen et al. | |
| 7,305,441 B2 | 12/2007 | Mathewson, II et al. | |
| 7,584,251 B2 * | 9/2009 | Brown et al. | 709/206 |
| 8,078,681 B2 | 12/2011 | Gardner et al. | |
| 2004/0107125 A1 | 6/2004 | Guheen et al. | |
| 2004/0181580 A1 | 9/2004 | Baranshamaje | |
| 2004/0240642 A1 | 12/2004 | Crandell et al. | |
| 2005/0043015 A1 | 2/2005 | Muramatsu | |
| 2005/0076085 A1 | 4/2005 | Budd et al. | |
| 2006/0031347 A1 * | 2/2006 | Sahi | 709/206 |
| 2006/0252415 A1 | 11/2006 | Lazaridis et al. | |
| 2007/0073818 A1 | 3/2007 | Gardner et al. | |
| 2007/0093243 A1 | 4/2007 | Kapadekar et al. | |
| 2007/0100978 A1 * | 5/2007 | Levi et al. | 709/223 |
| 2007/0112880 A1 | 5/2007 | Yang et al. | |
| 2007/0226303 A1 * | 9/2007 | Provo | 709/206 |

FOREIGN PATENT DOCUMENTS

EP 1435710 A2 7/2004

* cited by examiner

*Primary Examiner* — Maria El-Zoobi

(74) *Attorney, Agent, or Firm* — Louis B. Allard; Borden Ladner Gervais LLP

(57) ABSTRACT

The disclosed and claimed concept describes a handheld electronic device that has the capability to process electronic messages that originate from an electronic mail service using the features that are supported by the electronic mail service.

18 Claims, 3 Drawing Sheets

HANDHELD ELECTRONIC DEVICE HAVING SERVICE-SPECIFIC MESSAGE MANAGEMENT FEATURE SUPPORT AND ASSOCIATED METHOD

This is a continuation of U.S. application Ser. No. 11/469,619 filed Sep. 1, 2006, the contents of which are incorporated herein by reference.

BACKGROUND

1. Field

The disclosed and claimed concept relates generally to handheld electronic devices and, more particularly, to a method for processing electronic mail messages on a handheld electronic device using the supported features of an electronic mail service, and synchronizing the electronic mail service to reflect the processed electronic mail messages on the handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

If a handheld electronic device does have wireless communication capabilities, then the handheld electronic device will most likely have the ability to send and receive electronic messages (e.g. e-mail). Many of these handheld electronic devices receive electronic messages from one or more electronic mail services, which have various ways (features) to manage (e.g. filter, sort, store, and classify) electronic messages, via "push" or "pull" technology. When the electronic messages are received by the handheld electronic device from an electronic mail service, however, the handheld electronic device often does not have the capability to manage the electronic messages using the features of the electronic mail service from which the electronic message originated.

BRIEF DESCRIPTION OF THE DRAWINGS

A full understanding of the disclosed and claimed concept can be gained from the following Description when read in conjunction with the accompanying drawings in which:

DESCRIPTION

Figure 1:
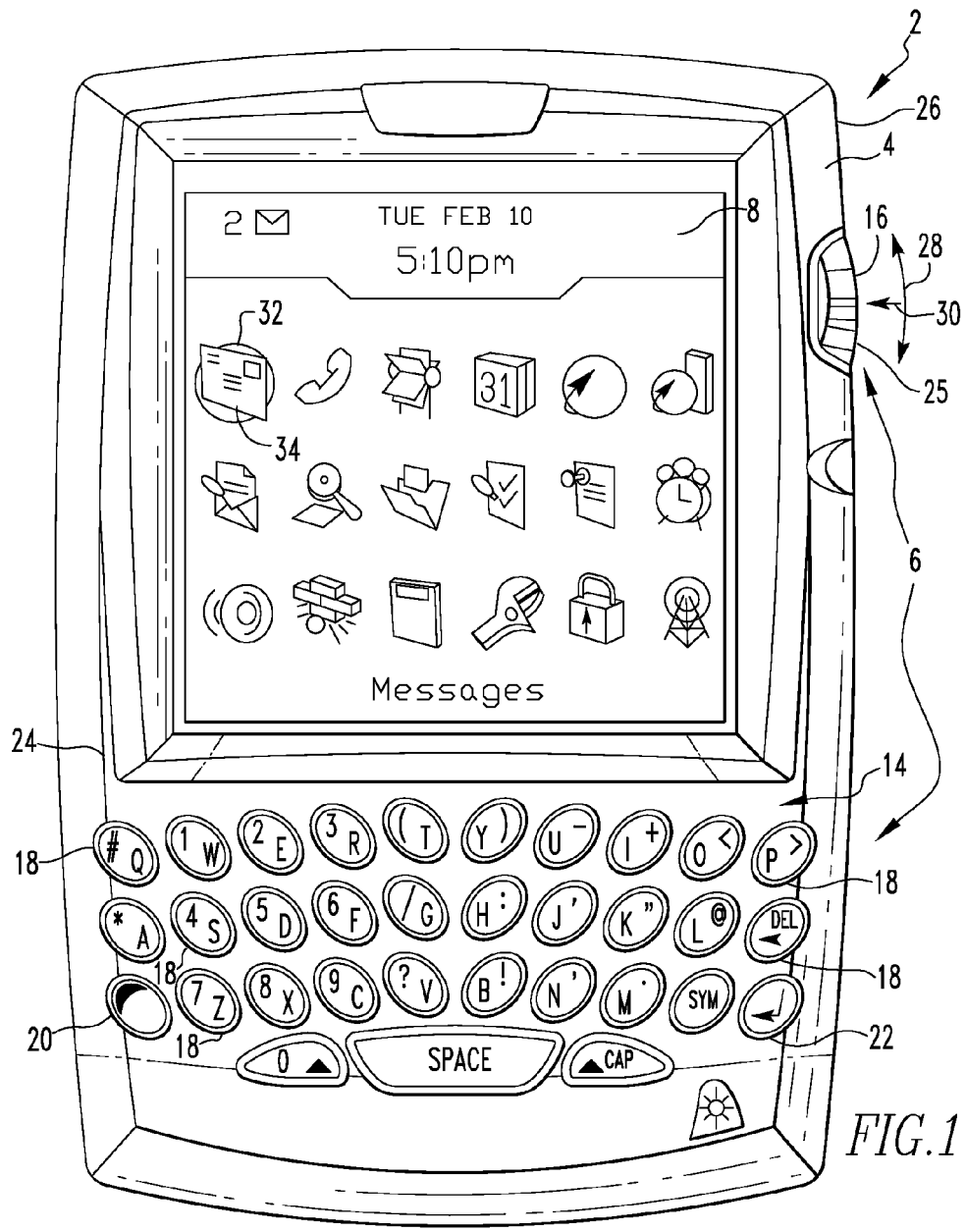
FIG. 1 is a top plan view of an embodiment of the handheld electronic device.

As used herein, the phrase "a number" or variations thereof means one or an integer greater than one (i.e., a plurality).

As used herein, the phrase "electronic mail message" or variations thereof shall refer broadly to a data file that comprises text and/or non-text components that are transmitted between electronic devices that include, but not limited to, computers, cellular telephones, handheld electronic devices, and personal data assistants.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

Figure 1A:
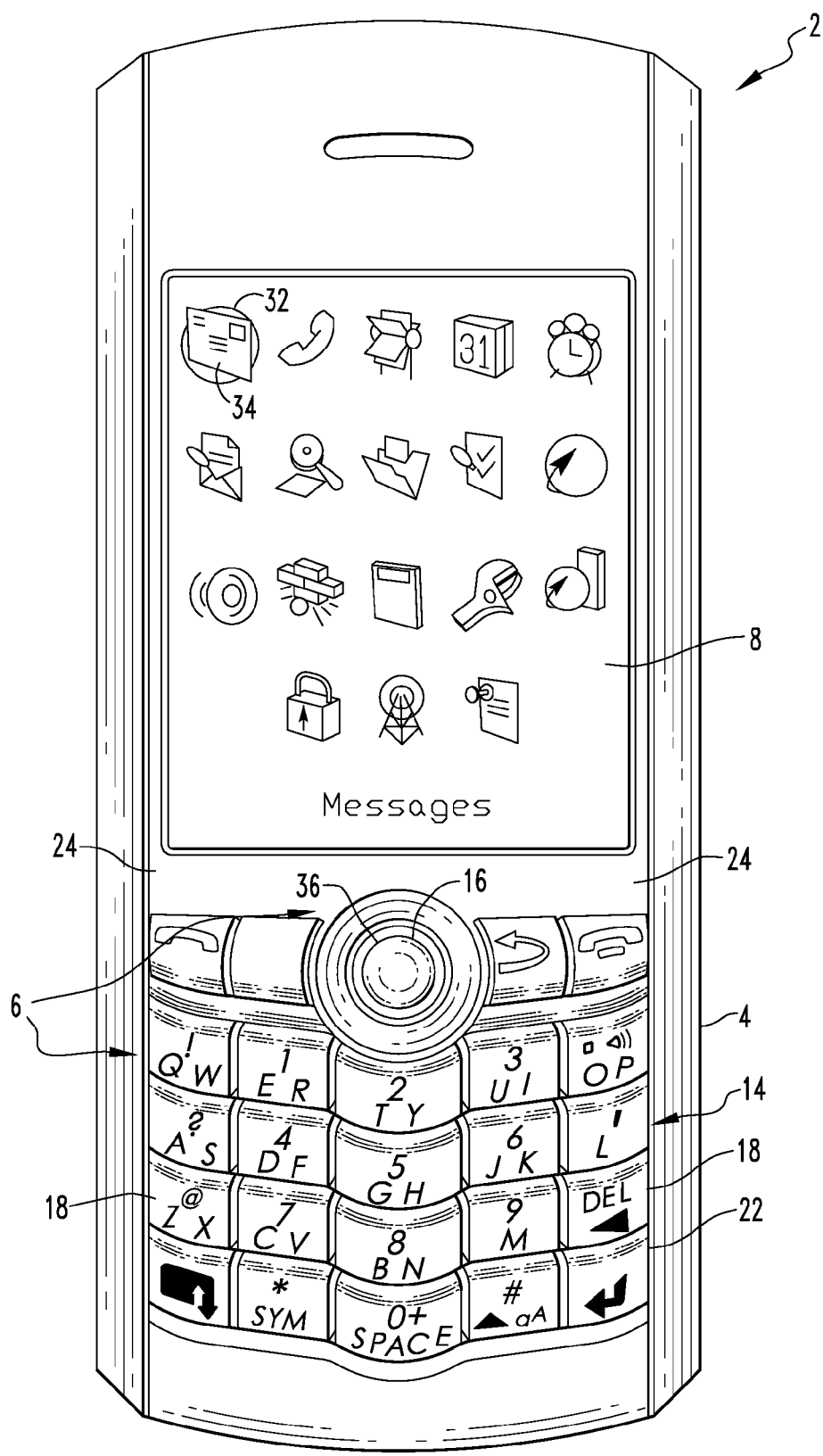
FIG. 1A is a top plan view of another embodiment of the handheld electronic device.

Two embodiments of a handheld electronic device 2 is depicted generally in FIGS. 1 and 1A. The handheld electronic device of FIGS. 1 and 1A is depicted schematically in FIG. 2. The handheld electronic device 2 includes a housing 4 upon which are disposed a processor unit that includes an input apparatus 6, an output apparatus 8, a processor 10, a memory 12, a transmitter 13, and a receiver 15. The processor 10 may be, for instance, and without limitation, a microprocessor (PP) and is responsive to inputs from the input apparatus 6 and provides output signals to the output apparatus 8. The processor 10 also interfaces with the memory 12 which, as will be discussed in greater detail below, contains one or more routines that are adapted to implement one or more features that are stored in the handheld electronic device's 2 memory 12. The processor 10 and the memory 12 together form a processor apparatus.

Referring to FIG. 1, the input apparatus 6 includes a keypad 14 and a navigational input 16. The keypad 14 is in the exemplary form of a QWERTY keyboard including a plurality of keys 18 that serve as input members. For instance, the keypad 14 includes an <ALT> key 20 AND an <ENTER> key 22. It is noted, however, that the keypad 14 may be of other configurations, such as an AZERTY keyboard, a reduced QWERTY keyboard, a QWERTZ keyboard or another keyboard arrangement, whether presently known or unknown.

The keys 18 are located on a front face 24 of the housing 4, and the navigational input 16, which in this embodiment is a trackwheel 25, is disposed on a side 26 of the housing 4. In addition to the keys 18, the trackwheel 25 can serve as another input member since the trackwheel 25 is capable of being rotated, as indicated by arrow 28, and depressed generally toward the housing 4, as indicated by arrow 30. Rotation of the trackwheel 25 provides a navigation input, while depression of the trackwheel 25 provides a selection input. For example, if a cursor 32 is located over a given program icon 34, that program will be launched when the trackwheel 25 is depressed.

Referring to FIG. 1A, unlike the handheld electronic device 2 that is depicted in FIG. 1, the handheld electronic device 2 of this figure has a keypad 14 that is in the form of a reduced QWERTY keyboard which has a plurality of keys 18 that serve as input members. In this embodiment of the handheld electronic device 2, the navigational input 16 is not disposed on a side 26 of the housing 4. Rather, the navigational input 16, which is a trackball 36, is disposed on the front face 24 of the housing 4. The trackball 36 is rotatable thereby allowing for the navigation of the cursor 32, which is displayed on the output apparatus 8, in various directions including up, down, left, right, and any combination thereof Moreover, the trackball 36 can also be depressed. When the trackball 36 is depressed, a selection is made based upon the current location of the cursor 32. Accordingly, rotation of the trackball 36 can navigate the cursor 32 over a particular program icon 34, while depression of the trackball 36 can launch the program.

Figure 2:
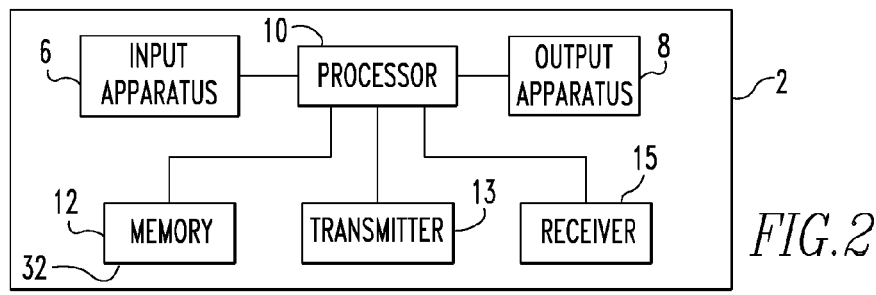
FIG. 2 is a schematic depiction of the handheld electronic device of FIGS. 1 and 1A.

Referring to FIG. 2, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 38 for the processing of data. The routines 38 can be in any of a variety of forms such as, without limitation, software, firmware, and the like.

As will be discussed in greater detail below, the features that are supported by an electronic mail service are stored or programmed into the handheld electronic device's 2 memory 12 awaiting implementation by the handheld electronic device 2. If the features that are supported by an electronic mail service are changed or updated, then the memory 12 on the handheld electronic device 2 can be updated to reflect those changes thereby allowing the handheld electronic device 2 to process electronic messages that originate from the electronic mail service using the electronic mail service's most recent set of features. The handheld electronic device's 2 memory 12 can be updated through a variety of ways including, but without limitation, the installation of firmware and/or software updates. The firmware and/or software updates can either be installed manually by the user of the handheld electronic device 2 or they can be installed automatically when the handheld electronic device 2 registers (i.e. connects) with a wireless network.

The disclosed and claimed concept enables a handheld electronic device 2 to process electronic messages that have been received on the handheld electronic device 2 using the features of the electronic mail service from which the electronic messages originated. This is accomplished by having the handheld electronic device 2 receive data from an electronic mail service that lists the features that are supported by the electronic mail service, and initiating a routine 32 that implements the supported features on the handheld electronic device 2. Once the features have been implemented, the handheld electronic device, upon receiving electronic messages that originate from the electronic mail service, will have the capability to process the electronic messages using the features that are supported by the electronic mail service. After the electronic messages have been processed on the handheld electronic device 2, the handheld electronic device 2 can synchronize with the electronic mail service so that any changes made to the electronic messages on the handheld electronic device 2 are also reflected in the electronic mail service.

In accordance with one embodiment of the disclosed and claimed concept, the handheld electronic device 2 is structured to receive data from one or more electronic mail services that lists the features that are supported by the electronic mail service. For instance, the handheld electronic device 2 would receive from a first electronic mail service, in a format that can be read by the handheld electronic device 2, the following data:

TABLE 1

| Features | Supported by the electronic mail service | Not Supported by the electronic mail service |
| --- | --- | --- |
| Read or Unread (system defined flags) | X | |
| Hierarchical Folders | X | |
| Non-Hierarchical Boolean Flags | X | |
| User Defined Flags | X | |
| Create Folders | X | |
| Move Folders | X | |
| Delete Folders | X | |

When the handheld electronic device 2 receives the data in Table 1, which lists the features that are supported by the first electronic mail service, from the first electronic mail service, the handheld electronic device will implement the supported features by initiating a routine that activates the features from memory 12. Once the features have been implemented, the handheld electronic device 2 has the capability to process electronic messages that originate from the first electronic mail service using the features that are supported by the first electronic mail service found in Table 1. For example, the electronic messages that were received from the first electronic mail service could be organized on the handheld electronic device 2 into hierarchical folders or marked as "read" or "unread".

The handheld electronic device 2 can also receive data from a second electronic mail service that lists, for example, the following supported features:

TABLE 2

| Features | Supported by the electronic mail service | Not Supported by the electronic mail service |
| --- | --- | --- |
| Read and Unread (system defined flags) | X | |
| Hierarchical Folders | | X |
| Non-Hierarchical Boolean Flags | X | |
| User Defined Flags | X | |
| Create Folders | | X |
| Move Folders | | X |
| Delete Folders | | X |

When the handheld electronic device 2 receives the data that is listed in Table 2 from the second electronic mail service, the handheld electronic device 2 will implement the supported features by activating the features from memory 12. Accordingly, when the handheld electronic device 2 receives electronic messages that originate from the second electronic mail service, the handheld electronic device 2 is able to process the electronic message in accordance with the features that are supported by the second electronic mail service. For instance, the electronic messages that are received from the second electronic mail device could be marked as "read" or "unread" or the electronic messages could be marked with non-hierarchical Boolean flags. It should be noted, however, that the handheld electronic device 2 will not be able to process electronic messages that originate from the second electronic mail service using all of the features that are supported by the first electronic mail service (e.g. hierarchical folders) since the second electronic mail service does not support some of the features that are supported by the first electronic mail service.

After an electronic message has been processed on the handheld electronic device 2, the handheld electronic device 2 will send data to the electronic mail service from which the electronic message originated in order to synchronize the electronic mail service with the changes made to the electronic message on the handheld electronic device 2. For example, if an electronic message is organized into a hierarchical folder on the handheld electronic device 2, then the handheld electronic device 2 will transmit data to the electronic mail service that synchronizes the electronic mail service with the handheld electronic device 2. Accordingly, the electronic message will also be organized into a corresponding hierarchical folder in the electronic mail service.

The data that lists the features that are supported by an electronic mail service can be transmitted to the handheld electronic device 2 in a variety of ways. For instance, the data could be appended to an electronic message that is being transmitted to the handheld electronic device 2 from the electronic mail service or the data can be transmitted to the handheld electronic device 2 prior receiving the electronic message.

Figure 3:
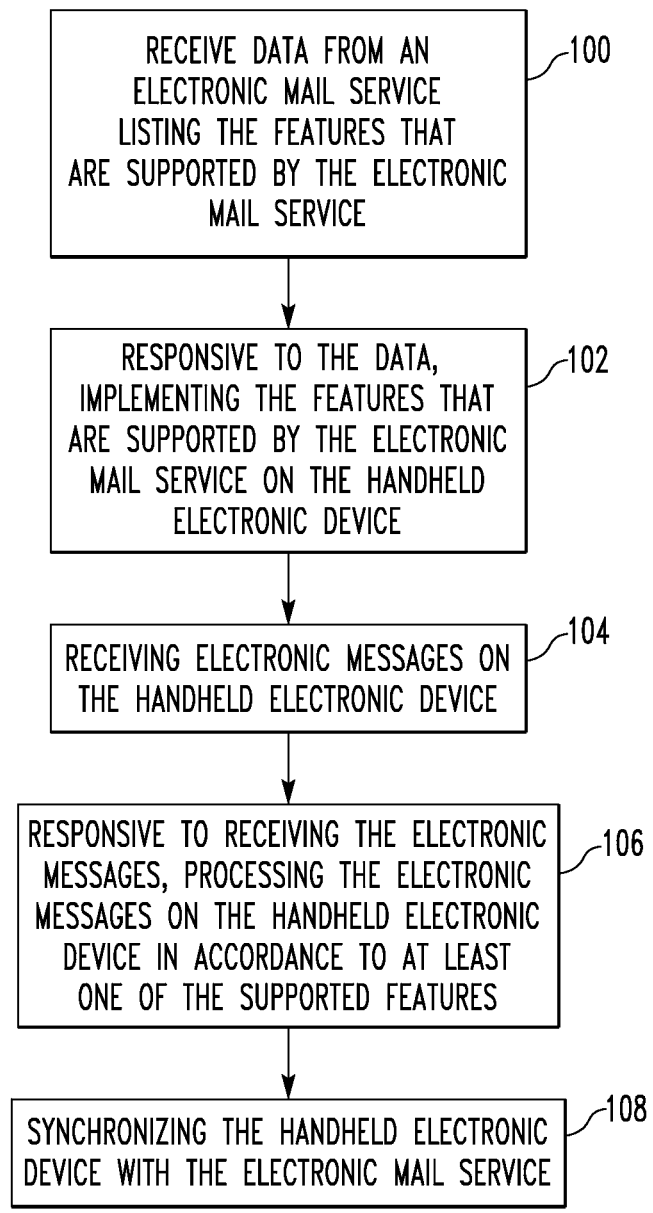
FIG. 3 is a flowchart depicting an embodiment of the disclosed and claimed concept.

Referring to FIG. 3, this figure depicts a flowchart of one embodiment of the disclosed concept. As can be seen from this figure, the handheld electronic device 2, at step 100, receives data from the electronic mail service which lists the features that are supported by the electronic mail service. Once the data has been received, the handheld electronic device 2, as at step 102, a routine is automatically initiated that activates the features on the handheld electronic device 2. When the handheld electronic device receives an electronic message, as at step 104, the handheld electronic device will have the capability of processing, as at step 106, the electronic message in accordance with at least one of the activated features. After the electronic message has been processed on the handheld electronic device 2, the handheld electronic device is synchronized, as at step 108, with the electronic mail service which ensures that any changes made to the electronic message on the handheld electronic device 2 is reflected in the electronic mail service. For example, if an electronic message is organized into a hierarchical folder on the handheld electronic device 2, the corresponding electronic message that is stored in the electronic mail service will also be organized into a corresponding hierarchical folder when the handheld electronic device is synchronized with the electronic mail service.

In another embodiment of the disclosed concept, any processing changes made to an electronic message on the electronic mail service is reflected on the handheld electronic device 2 by synchronizing the handheld electronic device 2 to the electronic mail service. For example, if an electronic message is marked with a user defined flag, such as "Friend", on the electronic mail service, the corresponding electronic message that is stored in the handheld electronic device 2 will also be marked with the user defined flag "Friend" when the handheld electronic device 2 is synchronized with the electronic mail service.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method performed by a handheld electronic device that receives electronic mail messages via either a first electronic mail service or a second electronic mail service, the method comprising:
   - determining at least one data management feature that is supported by a first electronic mail service and not supported by a second electronic mail service;
   - receiving an electronic mail message via one of the first electronic mail service or the second electronic mail service;
   - activating the data management feature if the electronic mail message was received via the first electronic mail service; and
   - not activating the data management feature if the electronic mail message was received via the second electronic mail service.

2. The method of claim 1, wherein the data management feature is one of hierarchical folders, non-hierarchical folders, system-defined flags, user-defined flags, or non-hierarchical Boolean flags.

3. The method of claim 2, further comprising processing a number of electronic mail messages in accordance with data management features supported by respective electronic mail services.

4. The method of claim 1, further comprising synchronizing with said one of the first electronic mail service or the second electronic mail service via which the electronic message was received, said synchronizing to reflect a processed state of said electronic mail message on said handheld electronic device.

5. The method of claim 1, further comprising receiving a list defining a first set of data management features that are supported by said first electronic mail service via a first electronic message from the first electronic mail service.

6. The method of claim 1, wherein said determining comprises receiving a list defining a first set of data management features that are supported by said first electronic mail service prior to receiving a first electronic mail message from the first electronic mail service.

7. A handheld electronic device, comprising:
   - a processor apparatus comprising a processor and a memory coupled with said processor, said memory having stored therein at least one routine which, when executed by the processor, causes the handheld electronic device to perform operations of:
   - determining at least one data management feature that is supported by a first electronic mail service and not supported by a second electronic mail service;
   - receiving an electronic mail message via one of the first electronic mail service or the second electronic mail service;
   - activating the data management feature if the electronic mail message was received via the first electronic mail service; and
   - not activating the data management feature if the electronic mail message was received via the second electronic mail service.

8. The handheld electronic device of claim 7, wherein the data management feature is one of hierarchical folders, non-hierarchical folders, system-defined flags, user-defined flags, or non-hierarchical Boolean flags.

9. The handheld electronic device of claim 8, wherein the at least one routine causes the handheld electronic device to perform operations further comprising processing a number of electronic mail messages in accordance with data management features supported by respective electronic mail services.

10. The handheld electronic device of claim 7, wherein the at least one routine causes the handheld electronic device to perform operations further comprising synchronizing with said one of the first electronic mail service or the second electronic mail service via which the electronic message was received, said synchronizing to reflect a processed state of said electronic mail message on said handheld electronic device.

11. The handheld electronic device of claim 7, wherein the at least one routine causes the handheld electronic device to perform operations further comprising receiving a list defining a first set of data management features that are supported by said first electronic mail service via a first electronic message from the first electronic mail service.

12. The handheld electronic device of claim 7, wherein said determining comprises receiving a list defining a first set of data management features that are supported by said first electronic mail service prior to receiving a first electronic mail message from the first electronic mail service.

13. A tangible, non-transitory computer-readable medium embodying instructions which, when executed by a processor, cause the processor to perform operations of:
   determining at least one data management feature that is supported by a first electronic mail service and not supported by a second electronic mail service;
   receiving an electronic mail message via one of the first electronic mail service or the second electronic mail service;
   activating the data management feature if the electronic mail message was received via the first electronic mail service; and
   not activating the data management feature if the electronic mail message was received via the second electronic mail service.

14. The tangible, non-transitory computer-readable medium of claim 13, wherein the data management feature is one of hierarchical folders, non-hierarchical folders, system-defined flags, user-defined flags, or non-hierarchical Boolean flags.

15. The tangible, non-transitory computer-readable medium of claim 14, wherein the processor performs operations further comprising processing a number of electronic mail messages in accordance with data management features supported by respective electronic mail services.

16. The tangible, non-transitory computer-readable medium of claim 13, wherein the processor performs operations further comprising synchronizing with said one of the first electronic mail service or the second electronic mail service via which the electronic message was received, said synchronizing to reflect a processed state of said electronic mail message on said handheld electronic device.

17. The tangible, non-transitory computer-readable medium of claim 13, wherein the processor performs operations further comprising receiving a list defining a first set of data management features that are supported by said first electronic mail service via a first electronic message from the first electronic mail service.

18. The tangible, non-transitory computer-readable medium of claim 13, wherein said determining comprises receiving a list defining a first set of data management features that are supported by said first electronic mail service prior to receiving a first electronic mail message from the first electronic mail service.

* * * * *